Figure 1:
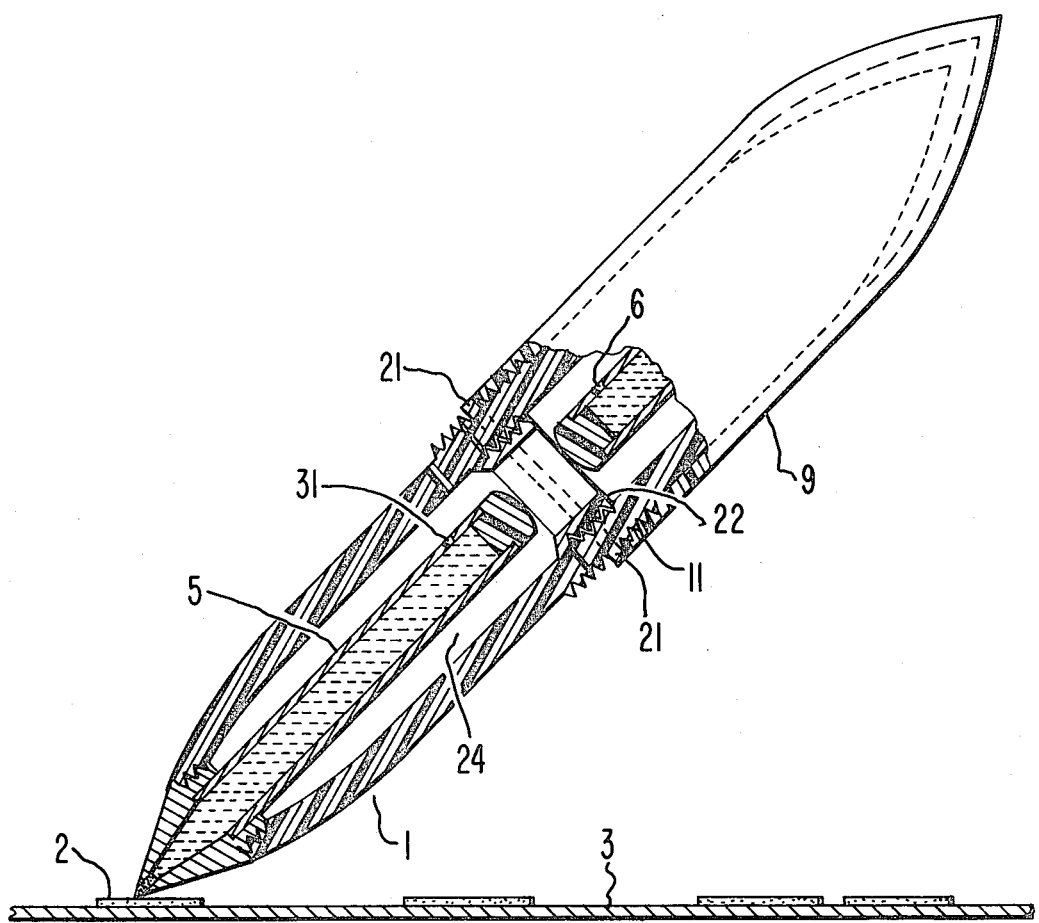

United States Patent [19]

Lin

[11] 4,227,930
[45] Oct. 14, 1980

[54] BALL POINT PEN, INK, AND ITS ERADICATOR SYSTEM

[75] Inventor: An-Chung R. Lin, Fairport, N.Y.

[73] Assignee: Burroughs Corporation, Detroit, Mich.

[21] Appl. No.: 960,360

[22] Filed: Nov. 13, 1978

Related U.S. Application Data

[62] Division of Ser. No. 784,653, Apr. 4, 1977, Pat. No. 4,156,657.

[51] Int. Cl.$^3$ ............................................. G09D 11/18
[52] U.S. Cl. ...................................... 106/19; 106/22; 252/188.3 R; 401/17; 401/18; 401/21; 401/34
[58] Field of Search ................ 252/188.3 R, 153, 156, 252/544, 548; 106/22, 19; 401/17, 18, 21, 34

[56] References Cited

U.S. PATENT DOCUMENTS

| | | | |
|---|---|---|---|
| 2,092,152 | 1/1936 | Bonkowski | 401/18 |
| 3,941,488 | 3/1976 | Maxwell | 401/17 |
| 3,945,837 | 3/1976 | Miyata et al. | 106/22 |
| 4,101,329 | 7/1978 | Loock | 106/22 |
| 4,162,164 | 7/1979 | Lin | 106/22 |

OTHER PUBLICATIONS

Ellis, C., "Printing Inks," Reinhold, 1940, p. 351.

*Primary Examiner*—Benjamin R. Padgett
*Assistant Examiner*—Irwin Gluck
*Attorney, Agent, or Firm*—Edward J. Feeney, Jr.; David G. Rasmussen; Kevin R. Peterson

[57] ABSTRACT

Disclosed is a ball point ink pen, its ink and its eradicator. The ink is carried at one end of the pen and the eradicator portion is carried at the other. If an error is made, the pen can be reversed and the eradicator used to neutralize the ink. The ink also neutralizes the eradicator so that when one rewrites with the same ink, any remaining eradicator on the paper is neutralized and the original ink acts as fresh ink.

3 Claims, 1 Drawing Figure

U.S. Patent

Oct. 14, 1980

4,227,930

BALL POINT PEN, INK, AND ITS ERADICATOR SYSTEM

This is a division of application Ser. No. 784,653, filed Apr. 4, 1977, now U.S. Pat. No. 4,156,657.

BACKGROUND OF THE INVENTION

In the prior art ink pens have been known which contain ink and eradicator. The eradicator bleaches the ink. However, the ink thus eradicated either reappears after a time due to oxidation of the eradicator or the eradicator is so effective that in the area where it has been used, the same ink cannot be reapplied. Thus normally one, two or three pens are required in order to have a reinkable system. The first ink is applied as fresh ink, another pen or the opposite side of the same pen, eradicates the first ink. Then a second pen is required in order to cover up the eradicated ink and make a new ink mark, but with a different ink.

SUMMARY OF THE INVENTION

My invention employs a ball point ink pen, its ink and its eradicator. The ink is carried at one end of the pen and the eradicator portion is preferably carried at the other. If an error is made, the pen can be reversed and the eradicator from end used to neutralize the ink. The ink also neutralizes the eradicator so that when one rewrites with the same ink, any remaining eradicator on the paper is neutralized and the original ink acts as fresh ink.

The preferred embodiment of the invention includes acids in the ink portion of the ink system which works to gradually neutralize its eradicator. The eradicator is a formulation which is basic so as to neutralize the acid ink and excess reactable bases which preferably are amines which react with the dye to form a colorless product. The eradicator and acid based ink are PH balanced so that the ink neutralizes the eradicator applied to form the colorless product. This permits fresh ink of the same formulation which is applied to the same spot to completely neutralize the eradicator, so that only the newly applied based ink appears.

The preferred embodiment of my invention is incorporated in a reversible pen of the type specifically shown in the accompanying drawings, in which:

FIG. 1 is a representation of the preferred ink pen embodiment of my invention.

In referring now to the drawings in greater detail, it will be seen that the ink pen 1 incorporating the preferred embodiments of my invention is shown writing on a mark 2 which has been applied to ordinary paper 3. The mark has been made with acid blue 22 dye carried in a glycol vehicle, preferably the vehicle is glycerine with water, and as a binder gum arabic is used. To the vehicle an amount of citric acid is added. This ink formulation is carried in the ink reservoir 5. An eradicator for the ink of reservoir 5 is contained in eradicator reservoir 6 on the opposite end of the pen 1. The preferred embodiment of my eradicator comprises water and ethanol, used as solvents, together with PH balanced bases including in my preferred embodiment ethanol amine; potassium hydroxide; and triethylene tetramine.

In operation, after the blue ink has been applied as a writing to the paper surface 3 and it is desired to eradicate it, the other end of the ball point pen is uncovered and the eradicator dispensed from the reservoir of the eradicator 6 to neutralize the acid of the ink and cause the ink to be neutralized. This permits the excess amines to react with the acidic dye to form a colorless product. Then the same ink may be used to write over previously eradicated area, the acid in the ball point pen reacting with excess eradicator to neutralize the reaction of the eradicator.

It will be noted that each reservoir is covered with a cap which may be screwed to form an air tight container for the ink and/or the eradicator. Each cap 9 (one is not shown) has a corresponding emitting thread 11 formed on the pen 1 to secure the cap tighted thereto.

Thus generally, it will be seen that the inclusions of acids in the ink portion of the system work to gradually neutralize the eradicator. The strong base (potassium hydroxide) in the eradiactor acts to neutralize the acid (citric acid) in the ink.

The color dye for the ink is chosen to be such that it may be neutralized to appear colorless with a corresponding PH balanced eradicator. Thus, the acid in the ink is already starting to act even while one is eradicating the acid ink. When one rewrites, any remaining eradiactor on the paper getting a second dose of acid from the fresh ink to be, in turn, neutralized and the dye appears to the observer.

The vehicle of the ball point pen ink should dissolve the acid dye. The vehicle is usually chosen from a group of glycol solvents or other polarity solvents such as other diols and alcohols and water. The binders are water or glycol soluble resins. Acids may be used to react with excess eradicator of the paper after eradication. These acids may be chosen from a group of acids including citric acid, lactic acid, oxalic acid, acetic acid, benzoic acid, phthalic acid, Malonic acid, Succinic acid, Glutaric acid, and any other acids derived from alipthic acids and aromatic acids or inorganic acids with Pka value smaller than 7.

The eradicators may be chosen from a group of containing amines. Typical bases may be chosen to neutralize the acid vehicle are chosen from the group consisting of potassium hydroxide, sodium hydroxide and other hydroxide bases. Solvents may include various hydroxy compounds including water, methanol, ethanol and like alcohols. The amines are chosen from a group which react with the acid dye to form a colorless product. The preferred dye is acid blue 22, but other dyes which react with the eradicator to form colorless products may be used including diphenyl methane and ether triphenyl methane dyes. Acid blue 22 is a triphenyl methane dye.

The amines which react with such dyes may be selected from groups consisting of Butyl amine, 3-methoxy propylamine, triethylene tetramine, ethanol amine and combinations thereof which may be alone or with ethanol amine, Butyl amine, Morpholine, Benzyl zmine or any other Aliphatic-like primary amines which reacts with the dye to form a colorless product.

The preferred embodiment of my invention is shown in the following formula.

EXAMPLES OF PREFERRED EMBODIMENT

| Formulation (wherein all percentages are by weight): | | | |
|---|---|---|---|
| Ball Point Pen Ink | | Eradicator | |
| $H_2O$ | 27.2% | $H_2O$ | 66.5% |
| Glycerine | 8.7% | Ethanol | 25.0% |
| Citric Acid | 38.0% | Ethanol amine | 5.0% |
| Gum Arabic | 13.0% | Potassium hydroxide | 1.5% |

-continued

| Formulation (wherein all percentages are by weight): | | | |
|---|---|---|---|
| Ball Point Pen Ink | | Eradicator | |
| Acid blue 22 | 13.1% | Triethylene tetramine | 2.0% |

Alternate ink formulas may be in accordance with the following formulas.

| Examples of Ball Point Ink Formula | | |
|---|---|---|
| I. | Diethylene glycol | 16.24% |
|  | Water | 11.62 |
|  | Citric acid | 23.18 |
|  | Butoxy triglycol | 13.05 |
|  | Benzyl alcohol | 9.09 |
|  | Oleic acid | 6.49 |
|  | Emerez 1536 | 6.43 |
|  | Acid Blue 22 | 13.90 |
| II. | Diethylene glycol | 15.49% |
|  | Water | 10.99 |
|  | Citric acid | 22.04 |
|  | PVP K-15 | 7.41 |
|  | Dimethyl phthalate | 6.17 |
|  | Benzyl alcohol | 24.69 |
|  | Acid Blue 22 | 13.21 |
| III. | Ethylene glycol | 10% |
|  | Water | 50 |
|  | Tartaric acid | 20 |
|  | Hydroxy ethyl cellulose WP-2 | 5 |
|  | Acid Blue 22 | 15 |
| IV. | Glycerine | 29.64% |
|  | Water | 42.58 |
|  | Elvanol | 3.92 |
|  | Tartaric acid | 4.71 |
|  | Citric acid | 4.71 |
|  | Gallic acid | 2.65 |
|  | Acid Blue 22 | 11.79 |

The other acids which can be used for the ink formulation: Lactic acid, Oxalic acid, Acetic acid, benzoic acid, phthalic acid, Malonic acid, Succinic acid, Glutaric acid. Any acids derive from aliphtic acid and aromatic acid or any acid with PKa smaller than 7. (Again all percentages are percent by weight)

Alternate eradicator formulas may be in accordance with the following formulas.

| Examples of Ball Point Pen Eradicator Formula | | | |
|---|---|---|---|
| | | Weight | % |
| I. | Potassium hydroxide | 1.95 | 0.97 |
|  | 3-Methoxy propyl amine | 4.85 | 2.43 |
|  | Ethanol amine | 4.86 | 2.43 |
|  | Glycerine | 40.08 | 20.04 |
|  | Water | 148.25 | 74.13 |
| II. | Sodium hydroxide | 0.36 | 0.72% |
|  | Water | 30.64 | 61.28 |
|  | Ethanol | 13.82 | 27.64 |
|  | Gum Arabic | 3.06 | 6.12 |
|  | Ethanol amine | 1.41 | 2.82 |
|  | Triethylene tetraamine | 0.71 | 1.42 |
| III. | Water | 68 | |
|  | Methanol | 25 | |
|  | Ethanol amine | 5 | |
|  | Potassium hydroxide | 2 | |
| IV. | Water | 93 | |
|  | Ethanol amine | 5 | |

| Examples of Ball Point Pen Eradicator Formula | | | |
|---|---|---|---|
| | | Weight | % |
| | Potassium hydroxide | 2 | |

Eradicators may also contain Ethyl amine, Butyl amine, Morpholine, Benzyl amine or any aliphatic primary amine. Again all percentages are percent by weight. Permissible variances in the formulas are approximate ±15% of the stated preferred percentage by weight.

It will be noted that my preferred embodiment of the invention incorporates the pen 1 of which as shown in its preferred embodiment is a reversible pen. The pen portion containing the compartment for the ink 5 and the portion containing the compartment of the eradicator 6 may be separated so that individual pens are formed thereby. The separation of the pen in two parts is accomplished in the following manner. The pen is grasped firmly at the top and bottom portions with both hands and twisted so that the upper and lower portions move in opposite counterclockwise directions, the bottom portion moving counterclockwise, the upper portion moving clockwise. This will cause the upper portion which contains a female end 21 to separate from the bottom portion which contains a mating male section 22. The mated portions have an air breather hole 23 entering into the atmospheric compartment 24 so that an atmosphere is maintained at ambient atmospheric pressure for smooth operation of the pen. Each compartment 5 and 6 likewise has an aperture e.g. 31 to this atmosphere for smooth delivery of the ink or eradicator respectively.

Thus, it may be understood a cap may be added to either one of the compartments so as to form a separable individual unit. This may be formed by making what might be called a plug for the upper portion or a cap for the bottom portion.

It will be understood that alkali blue dye classified as a pigment may be used as the dye in the system. Such an alternate embodiment, like the formulations previously suggested could be used in other color transfer systems such as in a carbon paper or the like.

While my invention has been described in detail and is preferred in alternate embodiments, it will be understood that various modifications and rearrangements and reformulations will occur to those skilled in the art both now and in the future without departing from the claims which follow.

I claim:

1. A colored ink which can be eradicated after application, consisting of:
   a dye which remains colored in acid solution,
   a vehicle solution in which the dye will dissolve, and
   an acid with a PKa value smaller than 7.

2. An ink according to claim 1 wherein the acid is selected from a group consisting of citric acid, lactic acid, oxalic acid, acetic acid, benzoic acid, phthalic acid, Malonic acid, Succinic acid, Glutaric acid and other aliphatic, aromatic or inorganic acids having a PKa value below 7.

3. An ink according to claim 1 wherein the dye is chosen from a group of dyes which react with amines to form colorless products, said group comprising diphenyl methane and triphenyl methane dyes and alkali blue dye.

* * * * *